United States Patent
Kiuchi

(10) Patent No.: US 9,991,959 B2
(45) Date of Patent: Jun. 5, 2018

(54) FREQUENCY COMPARISON AND PHASE SYNCHRONIZATION IN OPTICAL SIGNALS

(71) Applicant: NATIONAL INSTITUTES OF NATURAL SCIENCES, Tokyo (JP)

(72) Inventor: Hitoshi Kiuchi, Tokyo (JP)

(73) Assignee: NATIONAL INSTITUTES OF NATURAL SCIENCES, Tokyo (JP)

( * ) Notice: Subject to any disclaimer, the term of this patent is extended or adjusted under 35 U.S.C. 154(b) by 0 days. days.

(21) Appl. No.: 15/296,927

(22) Filed: Oct. 18, 2016

(65) Prior Publication Data

US 2017/0214464 A1    Jul. 27, 2017

(30) Foreign Application Priority Data

Jan. 21, 2016   (JP) .................................. 2016-009701

(51) Int. Cl.
  *H04B 10/25*   (2013.01)
  *H04B 10/69*   (2013.01)
  *H04L 7/00*    (2006.01)

(52) U.S. Cl.
  CPC ....... *H04B 10/2504* (2013.01); *H04B 10/691* (2013.01); *H04L 7/0075* (2013.01)

(58) Field of Classification Search
  CPC .......................... H04B 10/2504; H04B 10/691
  See application file for complete search history.

(56) References Cited

U.S. PATENT DOCUMENTS

| | | | |
|---|---|---|---|
| 2006/0132793 A1* | 6/2006 | Ogawa | G01M 11/331 356/484 |
| 2008/0043784 A1 | 2/2008 | Wilcox | |
| 2009/0009772 A1* | 1/2009 | Tanimura | G01J 9/02 356/491 |
| 2009/0047030 A1* | 2/2009 | Hoshida | H04B 10/60 398/205 |
| 2009/0060524 A1* | 3/2009 | Kiuchi | H04B 10/2575 398/152 |

FOREIGN PATENT DOCUMENTS

JP                201310256 A     5/2013

* cited by examiner

*Primary Examiner* — Dzung Tran
(74) *Attorney, Agent, or Firm* — Birch, Stewart, Kolasch & Birch, LLP

(57) ABSTRACT

An optical oscillator 10 combines optical signals L1' and L2 to generate an optical signal L3. The optical signal L1' includes light waves W1' and W2' having frequencies spaced apart by a frequency difference $\Delta f1$. The optical signal L2 includes light waves W3 and W4 having frequencies spaced apart by a frequency difference $\Delta f2$. The optical oscillator 10 separates the optical signal L3 into optical signals L4 and L5, wherein the optical signal L4 includes the light waves W1' and W3 and the optical signal L5 includes the light waves W2' and W4. The optical oscillator 10 compares the frequency differences $\Delta f1$ and $\Delta f2$ based on frequency difference $\Delta f3$ between the light waves W1' and W3 included in the optical signal L4 and frequency difference $\Delta f4$ between the light waves W2' and W4 included in the optical signal L5.

5 Claims, 5 Drawing Sheets

FREQUENCY COMPARISON AND PHASE SYNCHRONIZATION IN OPTICAL SIGNALS

BACKGROUND OF THE INVENTION

Field of the Invention

The present invention is related to a method for comparing frequency differences between optical signals, a method for synchronizing phases of optical signals and a device for synchronizing phases of optical signals.

Description of the Related Art

It is possible to transmit highly stable high-frequency reference signals for long distances by using two coherent laser waves. This allows construction of extensive coherent systems. A high-frequency reference signal, transmitted as a beat signal between two light waves, is subjected to optical-electric signal conversion, and then phase-synchronized with an electric oscillator by using a phase synchronization circuit so that a new frequency is generated. Today, reference signals transmitted by two light waves span a wide frequency band ranging from low frequencies to a frequency of more than 100 GHz. In order to do this, various types of photomixers or frequency converters used for optical-electric signal conversion have to be provided ranging from those for low frequencies to those for high frequencies. A good example of this is ALMA (Atacama Large Millimeter/submillimeter Array). The construction of ALMA is described in J. F. Cliche, et al, "A 100-GHz-tunable photonic millimeter wave synthesizer for the Atacama Large Millimeter Array radio telescope", IEEE/MTT-S International Microwave Symposium, 2007, p. 349-352.

Great developments are expected in the future in the field of generating highly phase-stable signals from the microwave region to the terahertz wave region. The need thereof is growing in high speed optical communication, high-frequency astronomy, etc.

Using photonic technologies is advantageous for generating high-frequency wideband signals. Also, optical signals can be easily distributed for long distances by using fiber transmission. Recently, systems constituting an extensive coherent system by distributing a high-frequency optical reference signal in a broad area are beginning to be realized. A reference signal in a high frequency is advantageous for maintaining coherence because the signal does not require any multiplier or the like at the distributed destination. A good example of this is the ALMA. A high-frequency optical reference signal is generated and transmitted as a beat signal between two coherent laser waves. In conventional techniques, this high-frequency optical reference signal is converted into an electric signal by optical-electric signal conversion using a photomixer or the like to provide a frequency reference, which is used for comparison with a controlled signal as to their frequency differences.

FIG. 5 shows an example of a conventional frequency comparison method. This construction corresponds to a scheme referred to as PLL (Phase Locked Loop). A "two light wave generation means" generates an optical signal including two light waves. The optical signal is distributed in two paths by an "optical distributor". One of the distributed optical signals is subjected to optical-electric conversion and an output signal is outputted as a high-frequency electric signal having a frequency corresponding to a frequency difference between the two light waves. The other signal is also subjected to optical-electric conversion and a phase difference between this and a reference optical signal, which has been subjected to optical-electric conversion in a similar manner, is detected. The frequency difference of the two light waves (the optical signal) generated by the "two light wave generation means" is controlled based on this phase difference.

FIG. 6 shows another example of a conventional frequency comparison method. This construction represents a PLL oscillator synchronized with an optical reference signal. This example uses a "high-frequency electric signal generation means" instead of the "two light wave generation means". The signal from the "high-frequency electric signal generation means" is distributed in two paths, one of which is an output signal. A phase difference between the other path and an optical reference signal, subjected to optical-electric conversion, is detected. The frequency of the electric signal generated by the "high-frequency electric signal generation means" is controlled based on this phase difference.

Thus, in both the conventional examples, an optical-electric converter is required for detecting the frequency difference between two light waves at least in the optical reference signal. This optical-electric converter has to be operational over an entire range of possible frequencies for the optical reference signal.

SUMMARY OF THE INVENTION

However, conventional methods such as the above have a problem in that the number of converters required for performing optical-electric signal conversion increases in response to the breadth of the frequency range for the reference signal transmitted by the two light waves.

Today, reference signals transmitted by two light waves span a broad frequency band ranging from low frequencies to frequencies of more than 100 GHz. Accordingly, a broad band system has to provide various types of converters for performing optical-electric signal conversion (high-frequency photomixer, high-frequency mixer for frequency conversion (such as a harmonic mixer), etc.) from those for low frequencies to those for high frequencies. As a result, the construction of the system becomes complicated and may also become expensive.

The present invention is made in order to solve these problems and is aimed at providing a method for comparing frequency differences that reduces the number of converters required for performing optical-electric conversion.

In order to solve these problems, a method for comparing frequency differences between optical signals related to the present invention comprises:

combining a first optical signal and a second optical signal to generate a third optical signal, wherein the first optical signal includes a first light wave and a second light wave having frequencies spaced apart by a first frequency difference and wherein the second optical signal includes a third light wave and a fourth light wave having frequencies spaced apart by a second frequency difference;

separating the third optical signal into a fourth optical signal and a fifth optical signal, wherein the fourth optical signal includes the first and third light waves and the fifth optical signal includes the second and fourth light waves; and comparing the first frequency difference and the second frequency difference based on a third frequency difference and a fourth frequency difference, wherein the third frequency difference is a frequency difference between the first and third light waves included in the fourth optical signal and the fourth frequency difference is a frequency difference between the second and fourth light waves included in the fifth optical signal.

The method may further comprise shifting the frequency of the first or second optical signal before generating the third optical signal.

Comparing the first frequency difference and the second frequency difference may comprise:
generating a first electric signal having a frequency corresponding to the third frequency difference based on the fourth optical signal;
generating a second electric signal having a frequency corresponding to the fourth frequency difference based on the fifth optical signal; and
detecting a phase difference between the first and second electric signals.

Also, a method for synchronizing phases of optical signals related to the present invention uses any of the above methods, wherein:
the first frequency difference is variable and controlled;
the second frequency difference is a reference as a goal of control; and
the method further comprises changing the first frequency difference based on the phase difference.

Changing the first frequency difference may comprise:
generating an optical comb having a frequency interval corresponding to the phase difference; and
extracting the first and second light waves from the optical comb,
and the method may further comprise extracting two light waves, from the optical comb, including at least one light wave which is different from either of the first and second light waves.

Further, a device for synchronizing phases of optical signals related to the present invention uses any of the above methods and comprises:
a two light wave generator for generating the first optical signal;
an optical coupler for combining the first and second optical signals; and
an optical separator for separating the third optical signal into the fourth and fifth optical signals.

The device may further comprise:
a first photodetector for generating a first electric signal having a frequency corresponding to the third frequency difference based on the fourth optical signal; and
a second photodetector for generating a second electric signal having a frequency corresponding to the fourth frequency difference based on the fifth optical signal,
and upper limits of detectable frequency ranges for the first and second photodetectors may be lower than the first frequency difference.

According to the method for comparing frequency differences between optical signals, the method for synchronizing phases of optical signals and the device for synchronizing phases of optical signals related to the present invention, two optical signals are combined and separated for corresponding light wave pairs, and then frequency differences are detected and compared. Accordingly, the frequency range for which optical-electric conversion is required is limited so that the number of converters required is reduced.

DESCRIPTION OF THE PREFERRED EMBODIMENTS

First, an overview and operational principle of the invention are explained. The present invention is related to a method for comparing frequency differences between optical signals, a method for synchronizing phases of optical signals and a device for synchronizing phases of optical signals. This invention allows the extraction of reference signal phase, without using any high-frequency photomixer, from a high-frequency reference signal transmitted by two light waves and phase-synchronizing an optical signal oscillator which generates two light waves to be controlled.

The basic approach of the present invention is that a phase difference between a high-frequency optical reference signal and a signal outputted from an optical oscillator can be measured as phase differences detected by using two respective low-frequency photodetectors, without subjecting the high-frequency optical reference signal to optical-electric conversion directly, by using an optical frequency shifter or by slightly displacing a wavelength of a laser source for the two light wave generation means. With this approach, synchronization with the high-frequency optical reference signal ranging from a low frequency to a high frequency can be realized by a small number (e.g. two) of identical low-frequency photodetectors.

First Embodiment

Figure 1:
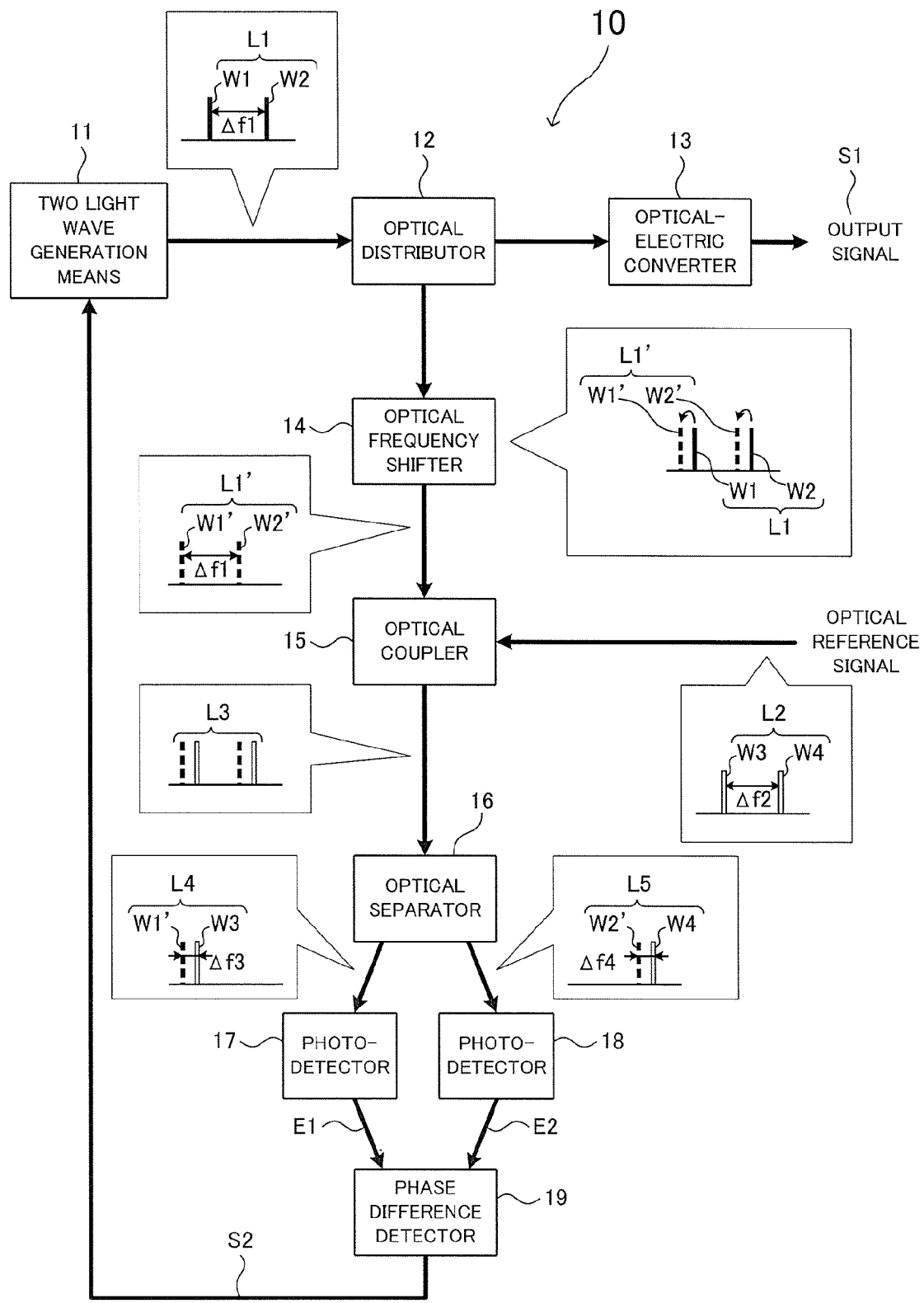
FIG. 1 shows an exemplary construction of an optical oscillator related to a first embodiment of the present invention.

Hereinafter, a first embodiment of the present invention will be explained. FIG. 1 shows an exemplary construction of an optical oscillator 10 related to the first embodiment of the present invention. The optical oscillator 10 comprises a two light wave generation means 11, an optical distributor 12, an optical-electric converter 13, an optical frequency shifter 14, an optical coupler 15, an optical separator 16, photodetectors 17 and 18 and a phase difference detector 19. These components excepting the optical-electric converter 13 constitute a phase locked loop. The optical oscillator 10 compares frequency differences between optical signals or synchronizes the optical signals by using a method described below.

Note that, since frequency and phase can be mutually converted through a differentiation or integration operation, frequency and phase may herein be treated as equivalents. In the following, the terms "frequency difference" and "phase difference" are interchangeable.

The two light wave generation means 11 operates by using a laser (not shown) for example. The two light wave generation means 11 generates optical signal L1 (first optical signal). The optical signal L1 includes light wave W1 (first light wave) and light wave W2 (second light wave). In the example of FIG. 1, the frequency of the light wave W1 is lower than the frequency of the light wave W2. The light waves W1 and W2 have frequencies spaced apart by frequency difference Δf1 (first frequency difference). The light waves W1 and W2 (and the light waves described below) are comprised by respective single frequency components.

Note that, although "frequency component" herein ideally means a component including a single frequency only, this may substantially mean a component having a width permitting realization of functions of the optical oscillator 10 described herein.

Also, for facilitating explanation, light including a single frequency component only is herein referred to as a "light wave" whereas light including a plurality of frequency components is herein referred to as an "optical signal" so that they may be distinguished. In particular, the term "optical signal" maymean a signal represented by a frequency difference between two light waves. However, these terms are not limited to such meanings and a light wave may, for example, include a plurality of frequency components.

The frequency difference $\Delta f1$ is variable and controlled. For example, two light wave generation means 11 can change $\Delta f1$ in response to a predetermined control signal (this is for example the undermentioned control signal S2, but another control signal not shown in the drawings may additionally be used) inputted externally. Such two light wave generation means 11 can be realized by using a two light wave generator that uses a Mach-Zehnder type optical modulator driven by a synthesizer. A specific example of a construction for the Mach-Zehnder type optical modulator is disclosed, for example, in "High Extinction Ratio Mach-Zehnder Modulator Applied to a Highly Stable Optical Signal Generator" (IEEE Trans. Microwave Theory and Techniques, vol. 55, no. 9, pp. 1964-1972, 2007) by Kiuchi, H., Kawanishi, T., Yamada, M., Sakamoto, T., Tsuchiya, M., Amagai, J. and Izutsu, M.

In another example, the two light wave generation means 11 may be constructed by using a PLL-type device. In the PLL type, an optical coupler is used to generate the optical signal L1 by combining a highly stable laser and a variable wavelength laser. The optical signal L1 is distributed in two paths, one of which being an output and the other being fed back for controlling the wavelength of the variable wavelength laser. The feed-back is performed, for example, by a construction wherein the optical signal L1 is first converted into a microwave signal by a photomixer, then the microwave signal and a control microwave signal that varies in response to an external control signal are combined by a microwave harmonic mixer or the like, then necessary frequencies are extracted by operating a filter on the combined microwave signal, and then the extracted signal is inputted to a generating device for the wavelength variable laser.

In a further example, the two light wave generation means 11 may be constructed by using an SSB (Single Side Band) modulator-type device. In this example, an SSB modulator generates the optical signal L1 by modulating an input laser (which does not have to be a highly stable laser) based on a modulation signal (a sine signal and a cosine signal). The modulation signal (the sine signal and the cosine signal) may for example be generated by using a 90 degree hybrid circuit and based on a control microwave signal that varies in response to an external control signal.

In a still further example, the two light wave generation means 11 may be constructed by using an AO (Acousto-Optic element) modulator-type device. In this example, an AO modulator generates the optical signal L1 by modulating an input laser (which does not have to be a highly stable laser) based on a control microwave signal that varies in response to an external control signal.

The optical distributor 12 distributes the inputted optical signal L1 into two outputs. One of the distributed outputs is inputted to the optical-electric converter 13 and the other is inputted to the optical frequency shifter 14.

The optical-electric converter 13 performs optical-electric conversion on the optical signal L1 and generates an electric signal as an output signal S1. Based on the frequency difference between the light waves W1 and W2 included in the optical signal L1, it outputs an electric signal having a frequency corresponding to the frequency difference. In this manner, the optical oscillator 10 related to the first embodiment can output an electric signal having a desired frequency.

The optical frequency shifter 14 shifts the frequency of the optical signal L1. That is, it shifts frequencies of the light waves W1 and W2 by the same amount. In the example of FIG. 1, the frequency of the optical signal L1 is shifted in a low-frequency direction so that an optical signal L1' including light waves W1' and W2' is generated. The frequency difference between the light waves W1' and W2' is equal to $\Delta f1$.

The amount of this shift (the shifting frequency) is a frequency greater than the instability in the two light wave generation means 11. In other words, the shifting frequency has a value greater than the width of the range wherein the frequency difference between the light waves W1 and W2 varies by an error or the like. Also, the shifting frequency is less than $\Delta f1$ and preferably much less than $\Delta f1$. The shifting frequency is, for example, designed so that its value is included in an operational frequency ranges of the undermentioned photodetectors 17 and 18.

Here, although the optical signals L1 and L1' include respectively different frequency components, their respective frequency differences between their frequency components are both $\Delta f1$ and equal to each other, so they can be regarded as essentially equivalent optical signals in the optical oscillator 10. Accordingly, with respect to the present invention, the optical signals L1 and L1' can both be regarded as the first optical signal. Also, in a similar manner, the light waves W1 and W1' can both be regarded as the first light wave and the light waves W2 and W2' can both be regarded as the second light wave.

The optical coupler 15 combines the optical signal L1' and the optical signal L2 (second optical signal). The optical signal L2 is a predetermined optical reference signal inputted externally. The optical signal L2 includes light wave W3 (third light wave) and light wave W4 (fourth light wave). In the example of FIG. 1, the frequency of the light wave W3 is lower than the frequency of the light wave W4. The light waves W3 and W4 have frequencies spaced apart by frequency difference $\Delta f2$ (second frequency difference). $\Delta f2$ is inputted as a goal of control (e.g. as a frequency reference for an output signal to be generated by the optical oscillator 10).

The optical coupler 15 generates and outputs an optical signal L3 (third optical signal) by combining the optical signals L1' and L2 in this manner. The optical signal L3 includes the light waves W1', W2', W3 and W4.

Figure 2:
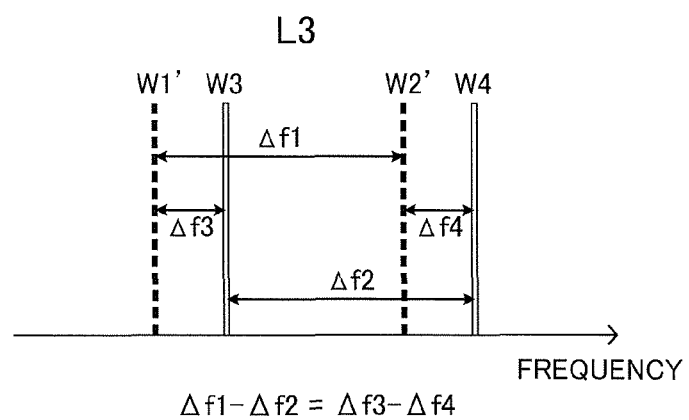
FIG. 2 shows a spectrum of a third optical signal.

FIG. 2 shows a spectrum of the optical signal L3. As described above, the frequency difference between the light waves W1' and W2' is $\Delta f1$ and the frequency difference between the light waves W3 and W4 is $\Delta f2$. Here, denoting the frequency difference between the light waves W1' and W3 by third frequency difference $\Delta f3$ and the frequency difference between the light waves W2' and W4 by fourth frequency difference $\Delta f4$, it is clear from FIG. 2 that $\Delta f1 - \Delta f2 = \Delta f3 - \Delta f4$.

The wavelength of the laser as a light source for the two light wave generation means 11 and the wavelength of the laser as a light source for the optical reference signal (the optical signal L2) have respectively different phase instabilities (fluctuations). However, errors due to the phase instabilities do not affect values calculated by the above equation because the errors are canceled by each other. If we explain this referring to FIG. 2, the light waves W1' and W2' have the same fluctuation so that they fluctuate together and the light waves W3 and W4 have the same fluctuation so that they fluctuate together, so their fluctuations can be canceled by taking the differences as in the above equation. Those skilled in the art would easily understand such principle based on FIG. 2.

The optical oscillator 10 compares $\Delta f1$ and $\Delta f2$ based on $\Delta f3$ and $\Delta f4$. Although this comparison may be performed in any manner, it is performed as described below in the example of FIG. 1.

The optical separator 16 separates the optical signal L3 into an optical signal L4 (fourth optical signal) and an optical signal L5 (fifth optical signal). Here, the optical signal L4 includes the light waves W1' and W3 and the optical signal L5 includes the light waves W2' and W4. Such an operation can be realized for example by extracting a frequency component less than a predetermined frequency threshold and another frequency component greater than the frequency threshold respectively from the optical signal L3. In the example of FIG. 2, a frequency at the midpoint of the frequencies of the light waves W3 and W2' can be chosen as the frequency threshold.

One of the outputs separated by the optical separator 16 is inputted to the photodetector 17 and the other is inputted to the photodetector 18. The photodetector 17 generates an electric signal E1 (first electric signal) having a frequency corresponding to $\Delta f3$ based on the optical signal L4. For example, the photodetector 17 performs optical-electric conversion on the optical signal L4 and generates the electric signal E1 as an electric signal having a frequency equal to $\Delta f3$. Similarly, the photodetector 18 generates an electric signal E2 (second electric signal) having a frequency corresponding to $\Delta f4$ based on the optical signal L5. For example, the photodetector 18 performs optical-electric conversion on the optical signal L5 and generates the electric signal E2 as an electric signal having a frequency equal to $\Delta f4$.

Here, the photodetectors 17 and 18 only have to detect the frequency differences $\Delta f3$ and $\Delta f4$ in the optical signals L4 and L5 respectively, regardless of the frequency difference $\Delta f1$ in the original optical signal L1. Accordingly, operational frequency ranges of the photodetectors 17 and 18 can be designed conforming to a variable range of $\Delta f3$ or $\Delta f4$ (e.g. from about several MHz to about several hundred MHz) regardless of a variable range of $\Delta f1$ (which can span a wide range from a low frequency to a frequency of more than 100 GHz), so it can be covered by a smaller number of photodetectors (for example a single detector). In other words, the number of photodetectors required can be reduced by designing upper limits of detectable frequency ranges for the photodetectors 17 and 18 to be lower than (preferably much lower than) $\Delta f1$.

The phase difference detector 19 compares $\Delta f3$ and $\Delta f4$ based on the electric signals E1 and E2. Although operation of the comparison may be performed in any manner, it is performed in the present embodiment by detecting a phase difference between the electric signals E1 and E2.

Thus, in the first embodiment, the photodetectors 17 and 18 and the phase difference detector 19 function as a comparison device (comparison means) for comparing $\Delta f1$ and $\Delta f2$ based on $\Delta f3$ and $\Delta f4$.

Although the result of comparison between $\Delta f3$ and $\Delta f4$ may be outputted or utilized in any manner, the result is outputted as a control signal S2 in the example of FIG. 1 and used for controlling an operation of the two light wave generation means 11. For example, the two light wave generation means 11 changes $\Delta f1$ in the optical signal L1 based on the phase difference between the electric signals E1 and E2 represented by the control signal S2. For example, the change is made so that $\Delta f1$ equals $\Delta f2$ or $\Delta f1$ gets closer to $\Delta f2$. According to such control, the optical oscillator 10 can synchronize the phase of the optical signal L1 with the phase of the optical signal L2.

Note that the shifting operation by the optical frequency shifter 14 causes an identical effect on the light waves W1 and W2, so the effect is removed in the detection operation at the phase difference detector 19 and does not affect (at least directly) the control signal S2.

Thus, as described above, in accordance with the optical oscillator 10 related to the first embodiment of the present invention, the number of photodetectors required can be reduced because the operational frequency ranges of the photodetectors 17 and 18 can be designed conforming to the variable range of $\Delta f3$ or $\Delta f4$ regardless of the variable range of $\Delta f1$.

Also, in accordance with the optical oscillator 10, the features described below are realized. The optical oscillator 10 obtains a difference between the phase of the high-frequency optical reference signal (optical signal L2) and the phase of the signal outputted by the optical oscillator 10 (the optical signal L1) without performing optical-electric conversion directly on the optical signal L2. In order to realize this, the optical oscillator 10 uses the optical frequency shifter 14 to slightly displace the wavelength of the laser which is the light source for the two light wave generation means 11 so that the difference between the frequencies detected respectively by the two low-frequency photodetectors is measured.

The optical oscillator 10 inputs the high-frequency optical reference signal directly as an optical signal rather than converting this into an electric signal at the original high frequency.

The optical oscillator 10 can support high-frequency optical reference signals from a low frequency to a high frequency (e.g. from the microwave region to the terahertz region) with two identical low-frequency photodetectors.

The optical oscillator 10 can perform phase comparison at a low frequency, so no high-frequency component such as a high-frequency photomixer or a high-frequency mixer is required within the phase locked loop.

Second Embodiment

In the first embodiment, the output of the phase difference detector 19 is inputted to the two light wave generation means 11 directly. In the second embodiment, a component for manipulating a signal is added therebetween. Differences from the first embodiment are described below.

Figure 3:
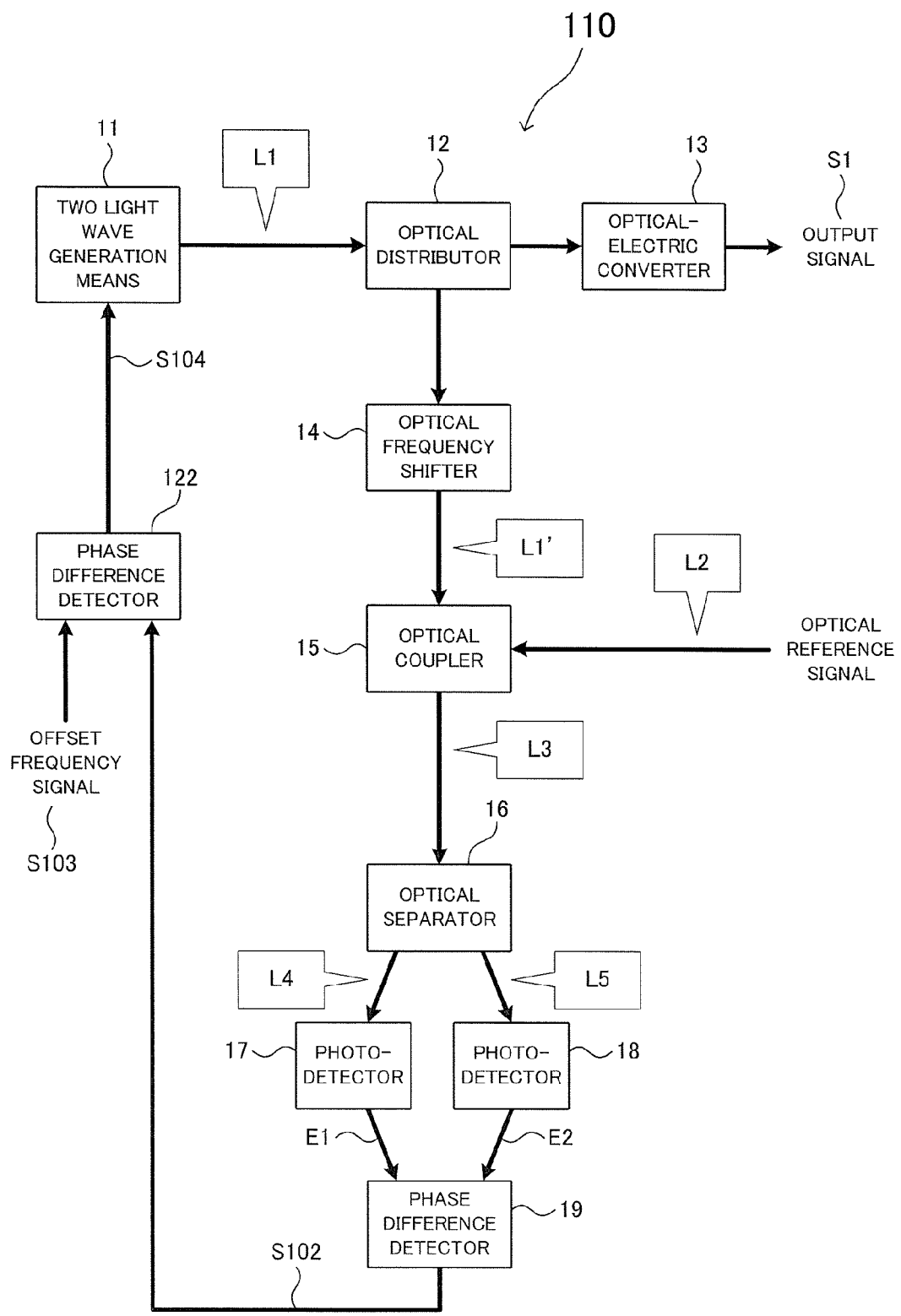
FIG. 3 shows an exemplary construction of an optical oscillator related to a second embodiment of the present invention.

FIG. 3 shows an exemplary construction of an optical oscillator 110 related to the second embodiment. The optical oscillator 110 comprises a phase difference detector 122 in addition to the construction of optical oscillator 10 related to the first embodiment. Inputted to the phase difference detector 122 are a phase difference signal S102 as an output of the phase difference detector 19 and an offset frequency signal S103 of a frequency corresponding to a predetermined offset. The offset frequency signal S103 is, for example, an electric signal with a microwave frequency. The phase difference detector 122 detects and outputs the phase difference between these two signals. The output is, for example, inputted to the two light wave generation means 11 as a control signal S104. The two light wave generation means 11 changes Δf1 in response to the control signal S104.

In accordance with such a construction, control of the Δf1 can be performed more flexibly. For example, Δf1 can be changed dynamically whereas Δf2 remains fixed by controlling the frequency of the offset frequency signal S103.

Also, the number of photodetectors required can be reduced in a manner similar to the optical oscillator 10 related to the first embodiment because the operational frequency ranges of the photodetectors 17 and 18 can be designed conforming to the variable range of Δf3 or Δf4 regardless of the variable range of Δf1.

Third Embodiment

In the first and second embodiments, the optical signal inputted to the optical-electric converter 13 and the optical signal inputted to the optical frequency shifter 14 are identical optical signals L1. In the third embodiment, an optical comb is used so that different pairs of light waves are extracted and inputted to the optical-electric converter 13 and the optical frequency shifter respectively. Differences from the second embodiment are explained below.

Figure 4:
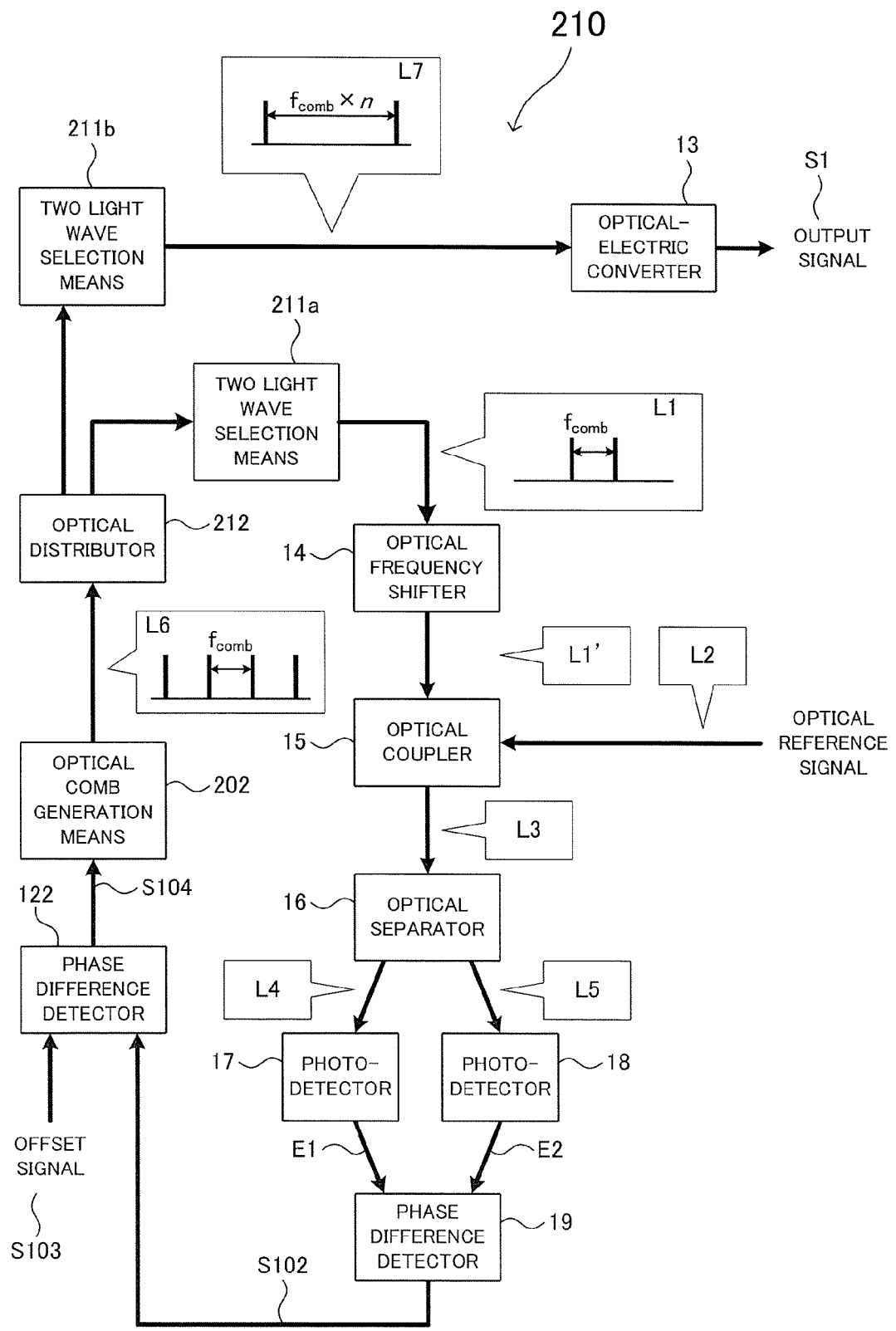
FIG. 4 shows an exemplary construction of an optical oscillator related to a third embodiment of the present invention.
Figure 5:
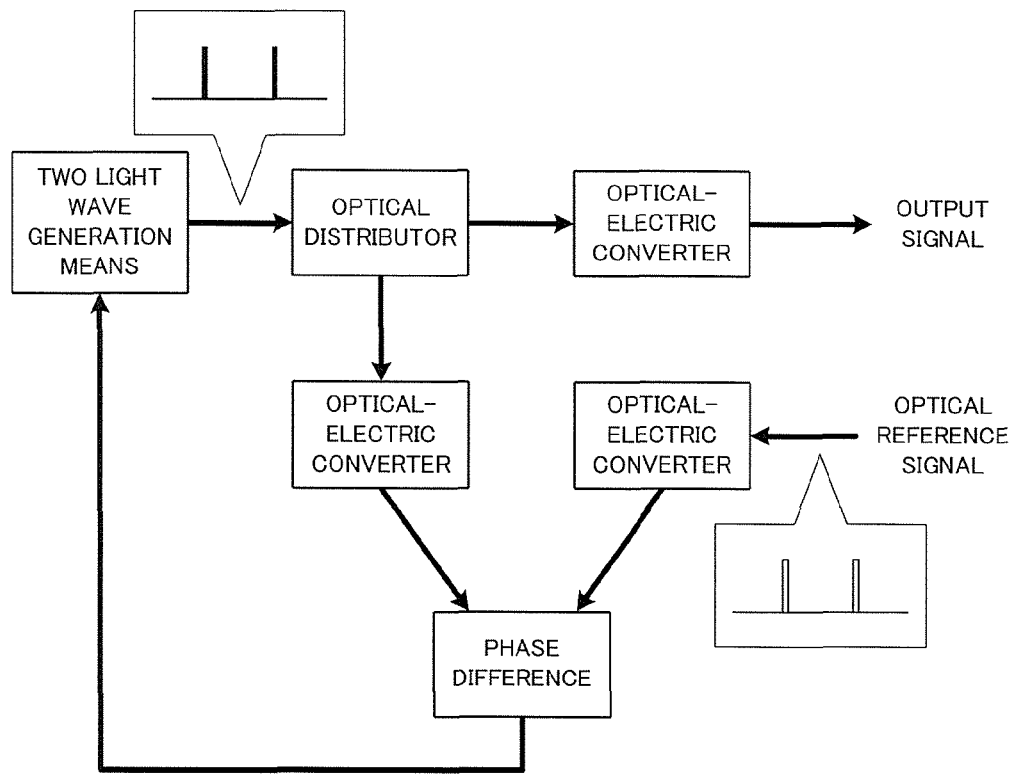
FIG. 5 shows an example of a conventional construction for comparing frequency differences.
Figure 6:
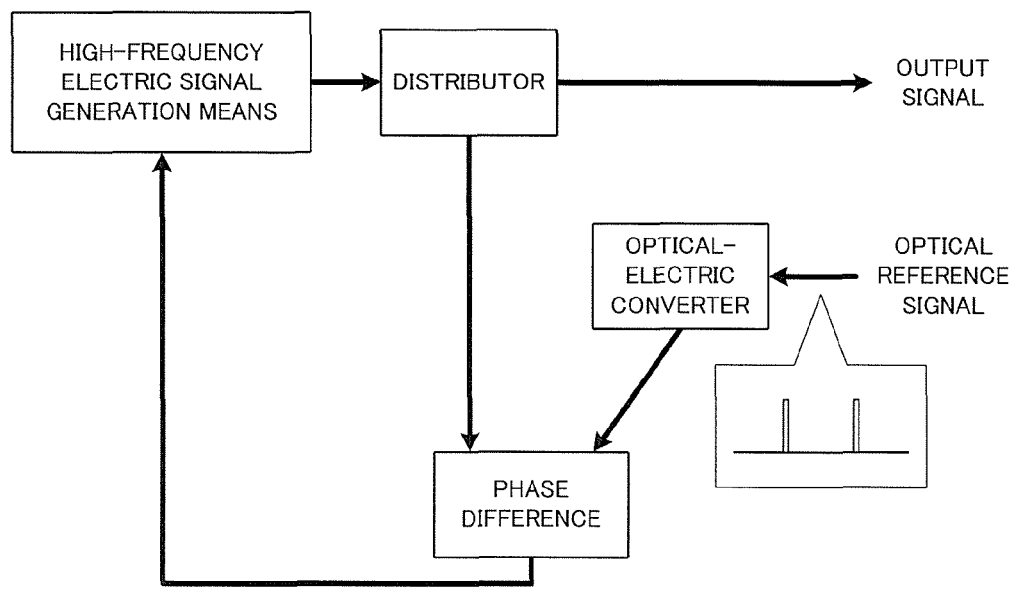
FIG. 6 shows another example of a conventional construction for comparing frequency differences.

FIG. 4 shows an exemplary construction of an optical oscillator 210 related to the third embodiment. The optical oscillator 210 comprises an optical comb generation means 202, an optical distributor 212, a first two light wave selection means 211a and a second two light wave selection means 211b instead of the two light wave generation means 11 and the optical distributor 12 in the optical oscillator 110 related to the second embodiment.

The optical comb generation means 202 generates an optical comb L6 based on the control signal S104 inputted from the phase difference detector 122. The optical comb L6 includes at least three light waves. The light waves are spaced apart by a frequency difference $f_{comb}$ to the frequency of the control signal S104. Here, the frequency of the control signal S104 is determined based on the phase difference between the electric signals E1 and E2, so it can be said that the optical comb L6 has a frequency interval corresponding to the phase difference.

The optical distributor 212 distributes the inputted optical comb L6 into two outputs. One of the distributed outputs is inputted to the first two light wave selection means 211a and the other is inputted to the second two light wave selection means 211b.

The first two light wave selection means 211a selects and extracts two adjacent light waves (corresponding to the light waves W1 and W2 in the first embodiment) from the optical comb L6 and outputs an optical signal including the two light waves as the optical signal L1. Thus, the frequency difference in the optical signal L1 (Δf1 in FIG. 1) is equal to $f_{comb}$. The optical signal L1 is inputted to the optical frequency shifter 14 in a manner similar to the first and second embodiments.

The second two light wave selection means 211b selects and extracts two predetermined light waves from the optical comb L6 and outputs an optical signal L7 including the two light waves. The frequency difference in the optical signal L7 is thus selectable at will, in response to the operation of the second two light wave selection means 211b, from among $f_{comb} \times n$ where n is an integer equal to or greater than 2. In the example of FIG. 4, n=3. n may be dynamically changeable.

By setting n to be 2 or greater, each two light wave selection means would extract respective different pairs of light waves. In other words, at least one of the two light waves extracted by the second two light wave selection means 211b would be different from either of the two light waves extracted by the first two light wave selection means 211a (which correspond to the light waves W1 and W2 in the first embodiment).

The optical signal L7 is inputted to the optical-electric converter 13. The optical-electric converter 13 performs optical-electric conversion on the optical signal L7 in a manner similar to the first and second embodiments to generate an electric signal as the output signal S1.

In accordance with such a construction, the optical oscillator 210 comprising a frequency multiplication function can be realized. That is, the frequency difference in the optical signal L7 is n times the frequency difference Δf2 in the optical signal L2.

Also, the number of photodetectors required can be reduced in a manner similar to the optical oscillator 10 related to the first embodiment because the operational frequency ranges of the photodetectors 17 and 18 can be designed conforming to the variable range of Δf3 or Δf4 regardless of the variable range of Δf1.

Although n is equal to or greater than 2 in the above third embodiment, the case of n=1 may be allowed. Also, although the first two light wave selection means 211a extracts two adjacent light waves from the optical comb L6 in the third embodiment, it may be constructed so that it can extract two non-adjacent light waves. For example, it may be constructed so that the frequency difference can be selected at will from among $f_{comb} \times m$ where m is an integer equal to or greater than 1. In this case, it may be set so that m>n or m=n. In particular, in the case wherein m=n, an optical oscillator substantially equivalent to the second embodiment is realized.

In the first to third embodiments above, the frequency shift is performed by the optical frequency shifter 14 on the optical signal L1. In a variant, the frequency shift may be performed in a different manner if it is performed before the optical signal L3 is generated. For example, this may be performed by slightly displacing the wavelength of the laser which is the light source for the two light wave generation means 11 or the optical comb generation means 202 (in which case the optical frequency shifter 14 is not required) or may be performed by an optical frequency shifter on the optical signal L2. Note that, in a construction wherein the frequency of the optical signal L2 (light waves W3 and W4) is shifted, both the optical signal L2 and the shifted version thereof can be regarded as the second optical signal.

The present invention can for example be applied in the fields of high-frequency astronomy and ultra-high-speed communication. Also, the present invention can be applied in fields utilizing waves from microwaves to terahertz waves.

What is claimed is:
1. A method for comparing frequency differences between optical signals, comprising:
combining a first optical signal and a second optical signal to generate a third optical signal, wherein the first optical signal includes a first light wave and a second light wave having frequencies spaced apart by a first frequency difference and wherein the second optical signal includes a third light wave and a fourth light wave having frequencies spaced apart by a second frequency difference;

separating the third optical signal into a fourth optical signal and a fifth optical signal, wherein the fourth optical signal includes the first and third light waves and the fifth optical signal includes the second and fourth light waves; and comparing the first frequency difference and the second frequency difference based on a third frequency difference and a fourth frequency difference, wherein the third frequency difference is a frequency difference between the first and third light waves included in the fourth optical signal and the fourth frequency difference is a frequency difference between the second and fourth light waves included in the fifth optical signal by generating a first electric signal having a frequency corresponding to the third frequency difference based on the fourth optical signal, generating a second electric signal having a frequency corresponding to the fourth frequency difference based on the fifth optical signal, and detecting a phase difference between the first and second electric signals, wherein the first frequency difference is variable and controlled, the second frequency difference is a reference as a goal of control; and changing the first frequency difference based on the phase difference.

2. The method of claim 1, further comprising shifting the frequency of the first or second optical signal before generating the third optical signal.

3. The method of claim 1, wherein changing the first frequency difference comprises:

generating an optical comb having a frequency interval corresponding to the phase difference; and extracting the first and second light waves from the optical comb, and wherein the method further comprises extracting two light waves, from the optical comb, including at least one light wave which is different from either of the first and second light waves.

4. A device for synchronizing phases of optical signals comprising:

a two light wave generator for generating the first optical signal, wherein the first optical signal includes a first light wave and a second light wave having frequencies spaced apart by a first frequency difference that is variable and controlled;

an optical coupler for combining the first and second optical signals, the optical coupler combining a first optical signal and a second optical signal to generate a third optical signal, and wherein the second optical signal includes a third light wave and a fourth light wave having frequencies spaced apart by a second frequency difference; and an optical separator for separating the third optical signal into the fourth and fifth optical signals by separating the third optical signal into a fourth optical signal and a fifth optical signal, wherein the fourth optical signal includes the first and third light waves and the fifth optical signal includes the second and fourth light waves; and an optical comparator for comparing the first frequency difference and the second frequency difference based on a third frequency difference and a fourth frequency difference, wherein the third frequency difference is a frequency difference between the first and third light waves included in the fourth optical signal and the fourth frequency difference is a frequency difference between the second and fourth light waves included in the fifth optical signal by generating a first electric signal having a frequency corresponding to the third frequency difference based on the fourth optical signal, generating a second electric signal having a frequency corresponding to the fourth frequency difference based on the fifth optical signal, and detecting a phase difference between the first and second electric signals, wherein the first frequency difference is variable and controlled, the second frequency difference is a reference as a goal of control; and changing the first frequency difference based on the phase difference.

5. The device of claim 4, further comprising:

a first photodetector for generating a first electric signal having a frequency corresponding to the third frequency difference based on the fourth optical signal; and a second photodetector for generating a second electric signal having a frequency corresponding to the fourth frequency difference based on the fifth optical signal, and wherein upper limits of detectable frequency ranges for the first and second photodetectors are lower than the first frequency difference.

* * * * *